United States Patent
Strom

(10) Patent No.: US 8,655,063 B2
(45) Date of Patent: Feb. 18, 2014

(54) DECODING SYSTEM AND METHOD OPERABLE ON ENCODED TEXTURE ELEMENT BLOCKS

(75) Inventor: Jacob Strom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 85 days.

(21) Appl. No.: 13/510,992

(22) PCT Filed: Feb. 24, 2010

(86) PCT No.: PCT/SE2010/050217
§ 371 (c)(1),
(2), (4) Date: May 21, 2012

(87) PCT Pub. No.: WO2011/065886
PCT Pub. Date: Jun. 3, 2011

(65) Prior Publication Data
US 2012/0281915 A1    Nov. 8, 2012

Related U.S. Application Data

(60) Provisional application No. 61/263,922, filed on Nov. 24, 2009, provisional application No. 61/266,316, filed on Dec. 3, 2009.

(51) Int. Cl.
*G06K 9/36*      (2006.01)
(52) U.S. Cl.
USPC .......................................................... 382/166
(58) Field of Classification Search
None
See application file for complete search history.

(56) References Cited

U.S. PATENT DOCUMENTS

| | | | |
|---|---|---|---|
| 5,956,431 A | | 9/1999 | Iourcha et al. |
| 6,111,582 A | * | 8/2000 | Jenkins ........................ 345/421 |
| 6,233,279 B1 | * | 5/2001 | Boon ....................... 375/240.08 |
| 6,968,006 B1 | * | 11/2005 | Puri et al. ................. 375/240.08 |

FOREIGN PATENT DOCUMENTS

| | | |
|---|---|---|
| EP | 1227444 A1 | 7/2002 |
| WO | WO 2005/059837 A1 | 6/2005 |
| WO | WO 2005/059839 A1 | 6/2005 |
| WO | WO 2006/006915 A1 | 1/2006 |
| WO | WO 2006/126949 | 11/2006 |
| WO | WO 2007/084062 A2 | 7/2007 |

OTHER PUBLICATIONS

International Search Report, PCT Application No. PCT/SE2010/050217, Oct. 29, 2010, 5 pages.

(Continued)

*Primary Examiner* — Bhavesh Mehta
*Assistant Examiner* — Feng Niu
(74) *Attorney, Agent, or Firm* — Myers Bigel Sibley & Sajovec, P.A.

(57) ABSTRACT

A decoding system comprises N different decoders each having a unique circuitry that is different from the circuitries of the other N−1 decoders. The decoders each generate at least one texel value based on an input encoded texel block. A value selector is configured to selectively output at least N texel values from at least one of the decoders based on the position of the at least N texels relative a boundary of a texel block comprising at least one of the at least N texels. A pixel calculator calculates a pixel value of a decoded pixel based on the at least N selected texel values from the value selector.

17 Claims, 9 Drawing Sheets

(56) References Cited

OTHER PUBLICATIONS

Written Opinion of the International Searching Authority, PCT Application No. PCT/SE2010/050217, Oct. 29, 2010, 8 pages.
Written Opinion of the International Searching Authority, PCT Application No. PCT/SE2010/050217, Feb. 24 2012, 4 pages.
Notification of Transmittal of the International Preliminary Report on Patentability, PCT Application No. PCT/SE2010/050217, Apr. 19, 2012, 16 pages.
Park et al., "A reconfigurable multilevel parallel texture cache memory with 75 GB/s parallel cache replacement bandwidth", IEEE Journal of Solid-State Circuits, vol. 37, Issue: 5, pp. 612-623, ISSN: 0018-9200, INSPEC Accession No. 7257600, Digital Object Identifier: 10.1109/4.997855, Date of Current Version: Aug. 7, 2002.
Strom et al., "ETC2: Texture Compression using Invalid Combinations" Aug. 4-5, 2007 San Diego, California; 7 pages.
Strom et al., "iPACKMAN: High-Quality, Low-Complezity Texture Compression for Mobile Phones" 2005; 9 pages.

* cited by examiner

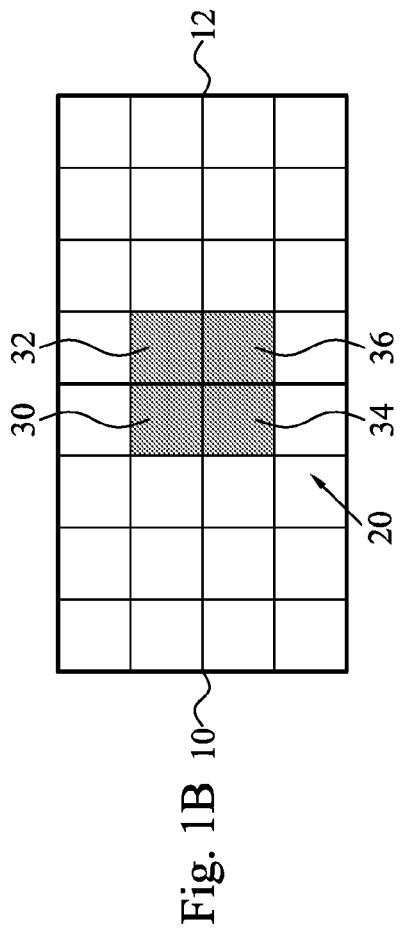
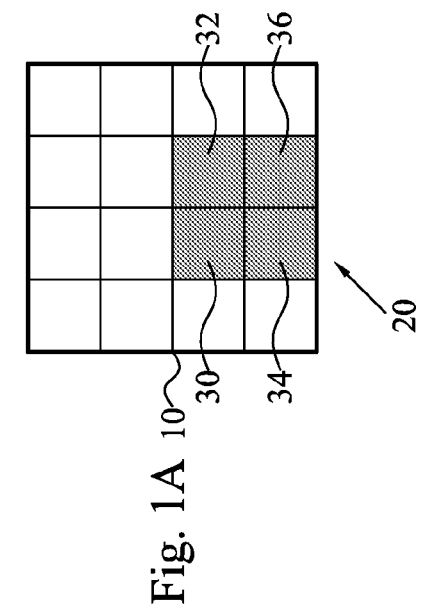
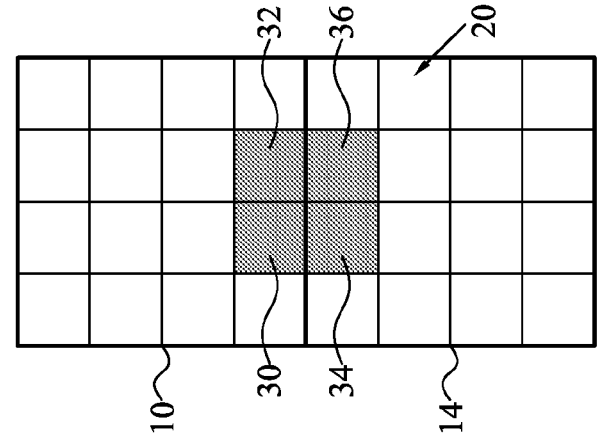
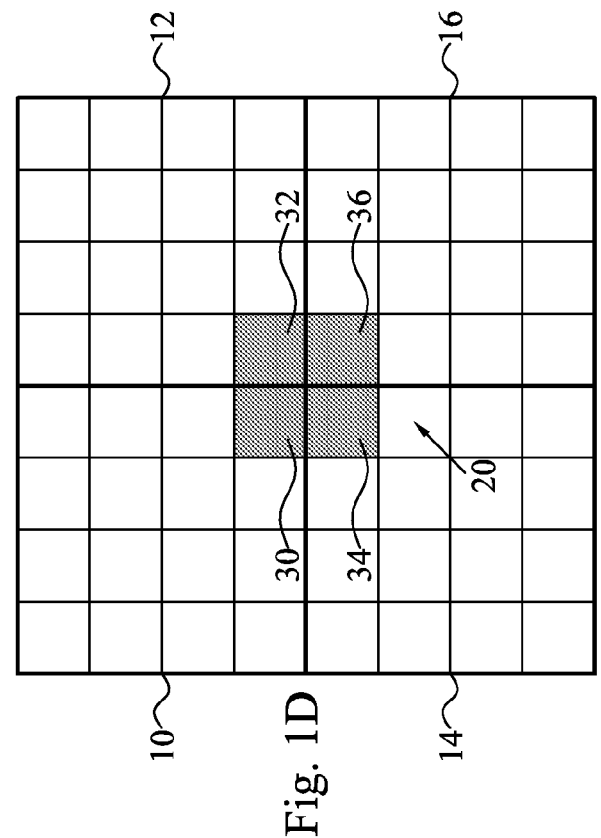

DECODING SYSTEM AND METHOD OPERABLE ON ENCODED TEXTURE ELEMENT BLOCKS

CROSS-REFERENCE TO RELATED APPLICATION

This application is a 35 U.S.C. §371 national stage application of PCT International Application No. PCT/SE2010/050217, filed on 24 Feb. 2010, which claims priority to U.S. provisional Patent Application No. 61/263,922, filed 24 Nov. 2009, which itself claims priority to U.S. provisional Patent Application No. 61/266,316, filed 3 Dec. 2009, the disclosure and content of all of which are incorporated by reference herein in their entirety. The above-referenced PCT International Application was published in the English language as International Publication No. WO 2011/065886 A1 on 3 Jun. 2011.

TECHNICAL FIELD

The present invention generally relates to decoding, and in particular to a decoding system and method operable on encoded texture element blocks.

BACKGROUND

When attempting to increase performance for graphics processing units (GPUs), one solution is to apply various techniques to reduce memory bandwidth consumption. Bandwidth reduction is also becoming increasingly important as the performance growth rate for processing power is much larger than performance growth rate for bandwidth and latency for random access memory (RAM).

Texture compression is one popular way of reducing bandwidth requirements. By storing textures in compressed form in memory and transferring blocks of the compressed data over the bus, the texture bandwidth is reduced substantially.

Today, the most used texture compression systems are DXTC [1] for Windows based systems and Xbox, and ETC [2] for mobile handsets. Both these systems divide an image, denoted texture, into texture element (texel) blocks of 4×4 texels and the red, green, blue (RGB) data of the texels is then compressed from (8+8+8)×16=384 bits down to 64 bits. Thus, each texel block is given the same number of bits. This is important since the rasterizer used in the decompression may need to access any part of the texture and needs to easily be able to calculate the memory address of the desired texel block. In other words, a fixed rate codec, i.e. a codec where every texel block takes up the same amount of storage space, is very desirable and is the norm among texture compression algorithms today.

Development of the ETC decoder has resulted in the so called ETC2 decoder [3] having extra functionality for handling the so-called T-mode, H-mode and a PLANAR-mode. The T- and H-mode are designed to handle texel blocks with uneven distribution of color and colors arranged in two groups, respectively. The hardware circuitry of the ETC decoder can be reused to a large extent to encompass the additional T- and H-modes. The PLANAR-mode is, though, quite different from ETC and the T- and H-modes and is designed to handle texel blocks with smooth color transitions. Complex hardware circuitry for the PLANAR-mode would imply that the complexity of the ETC2 decoder would increase significantly as compared to the ETC decoder.

There is, thus, a need for providing an efficient implementation of the PLANAR-mode and in particular such an implementation that can be provided as hardware implementation using a cost efficient circuitry. Such cost efficient circuitry is in particular desirable if the PLANAR-mode is to be used together with the ETC-decoder and the T- and H-modes to form the ETC2 decoder.

A similar problem is generally present within the art, i.e. there is a general need for a technique that can be applied to a decoding system with the purpose of reducing the implementation complexity.

SUMMARY

It is a general objective to provide an efficient decoding of encoded texel blocks.

It is a particular objective to provide a decoding structure that can be efficiently implemented in hardware.

These and other objectives are met by embodiments as disclosed herein.

Briefly, an embodiment relates to a decoding system for generating a decoded pixel based on at least one encoded texel block. The decoding system comprises N parallel decoders that each are configured to decode an encoded texel block to generate one or more texel values. According to the embodiment, the circuitries of the N decoders are different as compared to each other so that each decoder of the N decoders has a unique circuitry that is different from the circuitry of the other N−1 decoders. This enables the decoder circuitries to have different levels of complexities since the decoders have different capabilities in terms of the texel positions within a texel block they can handle.

The decoding system also comprises a value selector connected to the N decoders and configured to selectively output N texel values. These N texel values are further output from one or more of the N decoders. The particular texel values to output and from which decoder(s) depends on the position of a patch of N texels, having the N texel values, relative a texel block comprising at least one of the N texels. In other words, the position of the N texels relative texel block boundaries of a texture dictates which decoder outputs that are selected by the value selector and further forwarded to a pixel calculator. The pixel calculator is configured to calculate a decoded pixel value based on the N texel values selectively output by the value selector.

The careful choice by the value selector enables design of the decoders so that at least some of the N decoders can have a less complex circuitry than the other decoders. This is possible by restricting some of the decoders to only be able to decode and output texel values for certain texel positions within a texel block. As a consequence, the N decoders does not need to have identical circuitries but in clear contrast different circuitries with different levels of complexity in terms of the hardware structures per circuitry.

An embodiment defines a method of generating a pixel by decoding at least one encoded texel block. The method comprises selectively outputting N texel values from at least one of N different decoders, each having a circuitry that is unique and different from the circuitry of the other N−1 decoders. Each decoder further outputs at least one texel value based on an input encoded texel block. The selection of which texel values from the N decoders to use for the calculation of the pixel value of the pixel to decode is performed based on the position of the N texels associated with the N texel values relative the boundary of a texel block. The selected N texel values are then used for calculating the pixel value.

Embodiments enable an efficient implementation of a pixel decoding structure by reducing the complexity needed for at least some of the parallel decoders. The total complexity of the decoding structure is thereby reduced as compared to having N identical parallel decoders as in the prior art.

BRIEF DESCRIPTION OF THE DRAWINGS

The invention, together with further objects and advantages thereof, may best be understood by making reference to the following description taken together with the accompanying drawings, in which:

FIGS. 1A to 1D illustrate different positions of a bilinear patch relative texel block borders;

DETAILED DESCRIPTION

Figure 2:
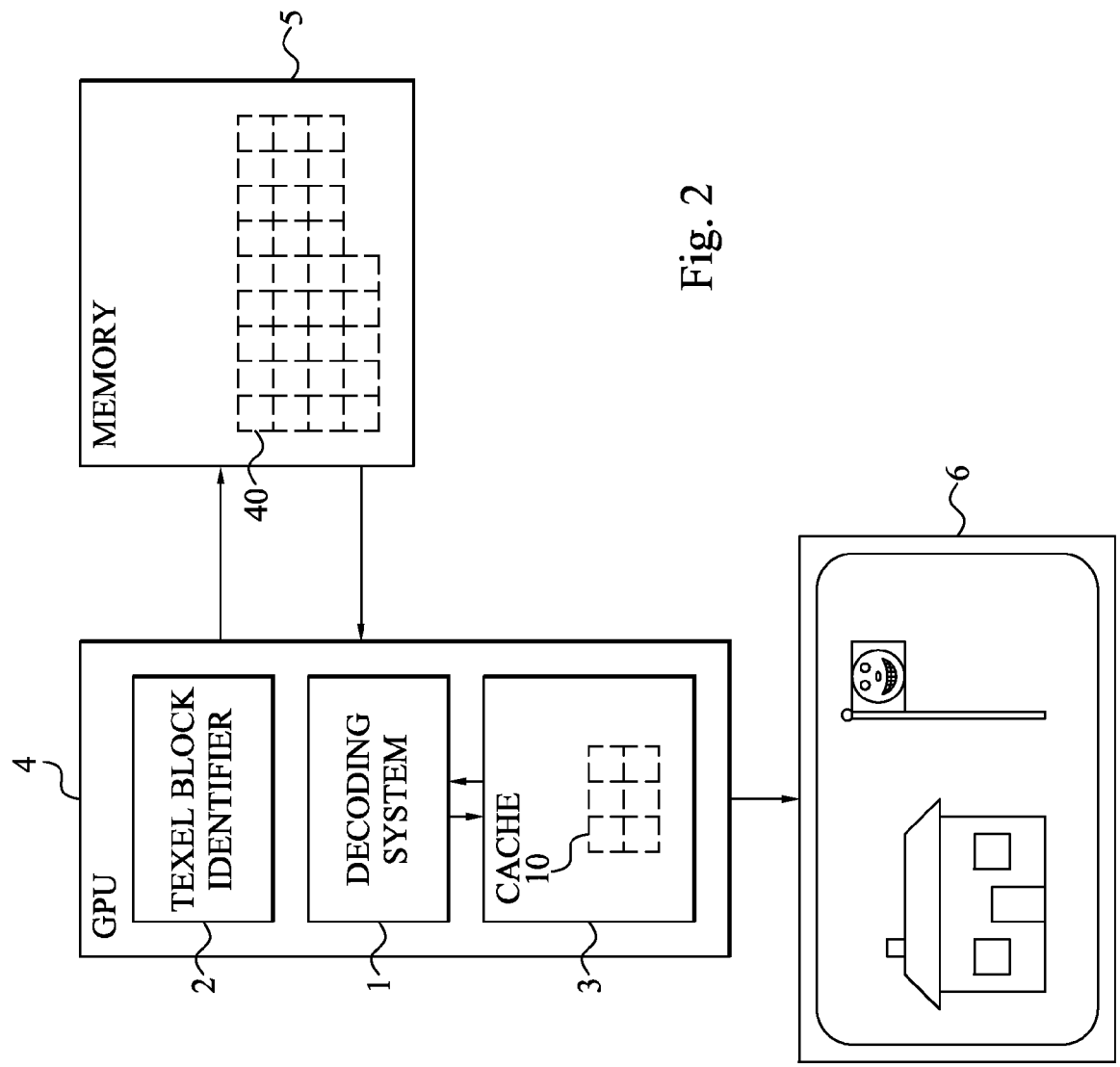
FIG. 2 is a schematic overview of a decoding arrangement comprising a decoding system according to an embodiment.

Throughout the drawings, the same reference numbers are used for similar or corresponding elements.

The embodiments generally relate to decoding or decompression of encoded or compressed texture element (texel) blocks for the purpose of generating decoded pixel values.

The decoding is well adapted for usage with three-dimensional (3D) graphics, such as games, 3D maps and scenes, 3D messages, e.g. animated messages, screen savers, man-machine interfaces (MMIs), etc., but is not limited thereto. Thus, the embodiments could also be employed for decoding other types of images or graphics, e.g. one-dimensional (1D), two-dimensional (2D) or 3D images.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage also performs sorting using a z-buffer.

However, rendering of textures, and in particular 3D images and graphics, is a computationally expensive task in terms of memory bandwidth and processing power required for the graphic systems. For example, textures are costly both in terms of memory, the textures must be placed on fast on-chip memory, and in terms of memory bandwidth, a texture can be accessed several times to draw a single pixel. Also multiple textures can sometimes be needed in order to draw a pixel.

In order to reduce the bandwidth and processing power requirements, a texture encoding method or system is typically employed. Such an encoding system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power, i.e. powered by batteries.

In the art textures are divided into so-called texel blocks, each comprising a number of texels. Such a texel block is typically rectangular or quadratic, such as a size of $M_R \times M_C$ texels, where $M_R$, $M_C$ are positive integer numbers with the proviso that both $M_R$ and $M_C$ are not simultaneously one. Preferably, $M_R=2m_R$ and $M_C=2m_C$, where $m_R$, $m_C$ are positive integers. In a typical implementation $M_R=M_C$ and preferred such block embodiments could be 4×4 texels.

In the art, pixel or image element is sometimes employed to denote a texture element of a texture. In the following description, texel is, though, employed to denote a texture element of a texture and pixel is used to denote a picture element generated from such texels in connection with resterization.

A texel is associated with a texel value and a pixel is associated with a pixel value. The texel and pixel values can advantageously be color values. A color value can be represented in various color formats, such as red, green, blue (RGB) color or as luminance and chrominance. Furthermore, a texel value could represent other properties of a texel, such as normal or Z value. In the following description, a texel value is non-limitedly exemplified as a color value.

A typical rasterizer does not access the texture a single texel at a time. Instead a small neighborhood of texels is employed, such as 2×2 texels. For instance, during bilinear filtering, four such neighboring texels are read to produce a bilinearly filtered value, i.e. a pixel value. In the art, such a group of neighboring texels co-processed in order to generate a pixel value is typically denoted patch. Hence, a 2×2 texel group employed in bilinear filtering is denoted a bilinear patch. This concept can be extended further, for instance, to trilinear filtering. Trilinear filtering uses two bilinear patches from two different mipmaps.

A problem with handling patches of texels is that the texels in a patch can span more than one texel block. This is schematically illustrated in FIGS. 1A to 1D. FIG. 1A illustrates the case where a bilinear patch 20 of four texels 30-36 are found in a single texel block 10. FIGS. 1B and 1C illustrate another situation where the bilinear patch 20 spans two pixel blocks 10, 12, 14 either present side-by-side (FIG. 1B) or on top of each other (FIG. 1C). The extreme case is depicted in FIG. 1D with one texel 30-36 of the bilinear patch 20 in a respective texel block 10-16.

The traditional way to solve this problem is to use four identical decoders, each of which decodes a predetermined texel in the bilinear patch. For instance, in the case of FIG. 1A, the encoded texel block representing the texel block 10 is input in the four decoders. The first decoder output texel (1, 2) 30, texel (2, 2) is obtained from the second decoder with the third and fourth decoders generating texel (1, 3) and (2, 3) 36 of the bilinear patch, respectively. A coordinate system in which the origin is in the top left texel of the texel block 10 is assumed. In FIG. 1D, the encoded texel block of texel block 10 is input in the first decoder to generate texel (3, 3) 10, the encoded texel block of texel block 12 is processed by the second decoder to get texel (0, 3) 32. The texel (3, 0) 34 is obtained from the third decoder based on the encoded texel block for texel block 14 and the fourth decoder output the texel (0, 0) 36 from the encoded texel block of texel block 16.

In this way it therefore possible to produce a 2×2 bilinear patch each clock cycle no matter what type of configuration (FIGS. 1A-1D) is encountered. High performance rasterization hardware produces two such bilinear patches per clock cycle to enable trilinear filtering. However, in such a case eight identical decoders are needed according to the prior art techniques.

The concept of co-processing texels in parallel decoders, however, dramatically increases the complexity of the decoding system, which is a problem for thin clients. For instance, adding the previously mentioned PLANAR-mode to the ETC-decoding system, would lead to an increase in complexity, defined as the number of adders, from 6 adders to 21 adders [3] per decoder. Thus, PLANAR uses 3.5 more adders than ETC and the complexity of the decoding system having four ETC decoders and four PLANAR decoders would increase with 3.5.

The embodiments as disclosed herein reduce the complexity of a decoding system by not utilizing identical parallel decoders. In clear contrast, different decoder circuitry can be used for the decoders if the decoders are designed to handle different number of texels and different texel positions within a patch.

Figures 3, 4, 5:
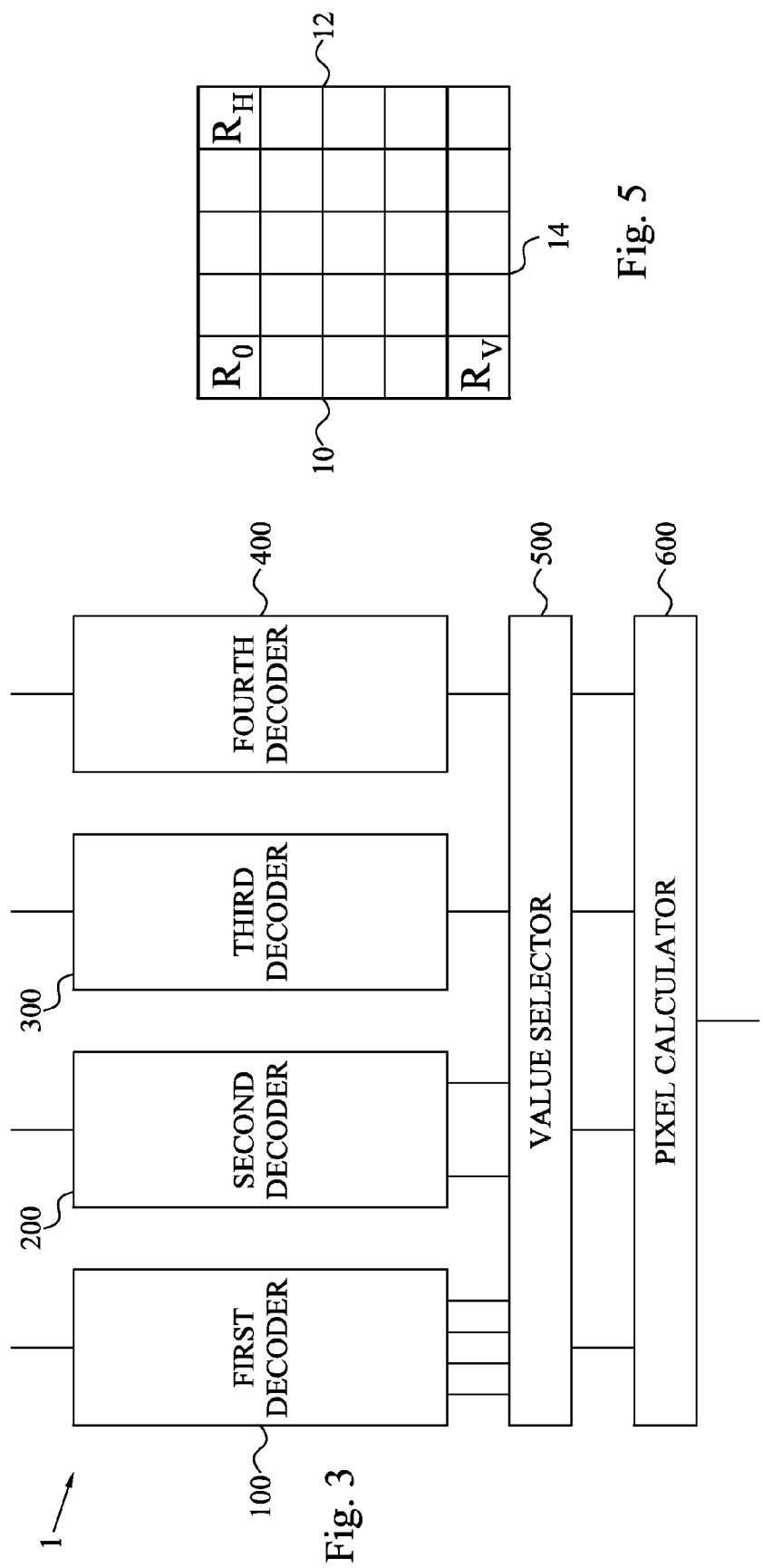
FIG. 3 is an illustration of a decoding system according to an embodiment.
FIG. 4 schematically illustrates an encoded texel block according to an embodiment.
FIG. 5 illustrates the concept of employing a planar approximation of texel property values in a texel block.

In a general embodiment the decoding system comprises N different decoders. Such a decoding system 1 is illustrated in FIG. 3, N exemplified as four. In a general embodiment N is an integer equal to or larger than two, preferably equal to four. Each decoder 100, 200, 300, 400 has a circuitry that is different from the circuitry of the other N−1 decoders. Thus, the decoding system 1 does not comprise identical decoders as in the prior art but in clear contrast different decoders 100, 200, 300, 400 with different unique circuitries. The difference in circuitries of the N decoders 100, 200, 300, 400 imply that the combination of the circuit elements of one of the decoders is different from the combination of the circuit elements in the other decoders. The decoders 100, 200, 300, 400 therefore have different implementation cost and complexity.

Each decoder 100, 200, 300, 400 is further configured to decode an encoded texel block to generate at least one texel value. The decoding system 1 also comprises a value selector 500 connected to the N decoders 100, 200, 300, 400 and configured to selectively output at least N texel values, preferably N texel values. These at least N texel values are output from at least one of the N decoders 100, 200, 300, 400. Additionally, the value selector 500 selects which at least N texel values and from which decoder(s) the texel values should be output based on the positions of the at least N texels associated with the at least N texel values relative a boundary of a texel block comprising at least one of the N texels. Thus, the positions of the N texels, the texel value of which should be generated by the decoding system 1, relative a texel block determines from which decoder or from which decoders of the N decoders 100, 200, 300, 400, the texel values should be fetched. A pixel calculator 600 of the decoding system 1 is connected to the value selector 500 and is configured to calculate a decoded pixel value of a decoded pixel based on the at least N texel values selectively output by the value selector 500.

The general embodiment achieves a reduction in complexity of the decoders 100, 200, 300, 400 by limiting some of the decoders to only be able to handle texels at certain texel positions within a texel block. As a consequence, the circuitry of these decoders 100, 200, 300, 400 can be significantly reduced as compared to the prior art case with no such restrictions on the decoders.

In a preferred embodiment, the first decoder 100 of the N decoders 100, 200, 300, 400 is configured to decode an input encoded texel block to generate N texel values. The value selector 500 is then configured to selectively output these N texel values from the first decoder 100 and further to the pixel calculator 500 if the N texels are positioned inside the boundaries of a texel block. FIG. 1A illustrates this case with N=4. Thus, if the four texels 30-36 of a bilinear patch 20 are all positioned inside a single texel block 10, the four texel values are all generated by the first decoder 100. This means that any output from the other decoders 200, 300, 400 is not selected by the value selector 500 nor used by the pixel calculator 600 to calculate a decoded pixel value.

If half of the N texels 30, 34 (30, 32) are positioned inside the boundaries of a texel block 10 and the remaining half of the N texels 32, 36 (34, 36) are positioned inside the boundaries of a neighboring pixel block 12 (14), see FIG. 1B (FIG. 1C), the value selector 500 is preferably configured to selectively output half of the N texel values from the first decoder 100 and the remaining half of the N texel values from the second decoder 200.

In a preferred embodiment with N=4 the first decoder 100 has a first circuitry configured to decode an input encoded texel block to generate four texel values. The second decoder 200 has a second circuitry and outputs two texel values based on an input encoded texel block. The third 300 and fourth 400 decoders comprise a third circuitry and a fourth circuitry, respectively. The third 300 and fourth 400 decoders each output a single texel value given an input encoded texel block.

In the situation illustrated in FIG. 1D, all preferably four decoders 100, 200, 300, 400 output texel values that are selected by the value selector 500. Thus, the value selector 500 is then configured to selectively output a first texel value from the first decoder 100, a second texel value from the second decoder 200, a third texel value from the third decoder 300 and finally a fourth texel value from the fourth decoder 400. In this case each of the four texels 30-36 is positioned within a respective texel block 10-16.

FIG. 2 schematically illustrates an implementation structure with a decoding system 1 according to an embodiment. The structure comprises a memory 5, typically a RAM, having memory locations comprising encoded texel blocks 40. A graphical processing unit (GPU) 4 is connected to the memory 5 through a memory bus. The GPU 4 includes texel block identifier 2 for identifying a texel block, the encoded block 40 of which should be fetched from the memory 5. The texel block identifier 2 basically calculates the address of the encoded texel block 40 in the memory and sends a memory access request over the bus to the memory 5. The encoded texel block 40 present in the memory location assigned or dedicated to the texel block is read from the memory and transferred over the bus to the decoding system 1 or to a cache 3 of the GPU 4.

The decoding system 1 comprises or is connected to at least one cache 3 having cache locations or areas for storing encoded texel blocks or decoded texel values. In an alternative embodiment, the GPU 4 could comprise multiple caches 3, such as a texture cache and color buffer cache. The GPU 4 is typically connected to a display screen 6, on which a decoded image is displayed.

The GPU 4 and its included units 1, 2, 3 may be provided in one or more chips, for instance of a graphics card, video card or a motherboard. The implementation structure of FIG. 2 can be implemented in any image or texture processing unit or device including, for instance, a computer, a game console, a portable device, such as mobile telephone or media processing device.

In the following, embodiments of the decoding system will be described in more detail in connection with different implementation examples. These examples are further designed to be suitable to handle texel blocks encoded according to PLANAR described in [3, 4]. Briefly, PLANAR is designed to handle texel blocks with smoothly varying chrominances. PLANAR approximates the color components (red, green, blue) in the texel block with a planar approximation. In order to specify a plane, it suffices to specify the colors in three locations in the texel block. FIG. 5 illustrates this concept with three red components $R_0$, $R_H$ and $R_V$ at certain positions relative a texel block 10. With this positioning of the three red components the red component can be calculated anywhere in the texel block 10 using the following equation:

$$R(x, y) = \text{round}\left(R_0 + \frac{1}{4}(R_H - R_0)x + \frac{1}{4}(R_V - R_0)y\right)$$

The blue and green components are calculated the same way as the red component. An encoded texel block 40 as illustrated in FIG. 4 therefore comprises three color codewords 41-49 per color component, i.e. $X_0$, $X_H$ and $X_V$, where X is R for the red component, G for the green component and B for the blue component. In a preferred implementation, six bits are preferably spent on each of the red codewords 41-43 and the blue codewords 47-49 and seven bits for each of the green codewords 44-46 since the human eye is more sensitive to the green component as compared to the red and blue components. The total size of the encoded texel block will be 57 bits, which fits exactly in the 57-bit mode of ETC2 [3]. If PLANAR is used standalone and not as a special mode to ETC, the encoded texel block 40 advantageously spend seven bits for all but one of the color codewords 41-47, such as G0 that instead is eight bits. The total size will then be 64 bits.

In a PLANAR implementation, the first decoder 100 of FIG. 3 can decode any 2×2 bilinear patch that has all four texels inside the texel block, see FIG. 1A. The second decoder 200 is less advanced and produces texel values for texels in the first row or the first column of a texel block, see texel 32, 36 in FIG. 1B and texels 34, 36 in FIG. 1C. The second decoder 200 therefore preferably outputs two texel values at once, either a 2×1 patch or a 1×2 patch. The third decoder 300 decodes an encoded texel block to generate a single texel value, preferably the upper right one at coordinate (3, 0), see texel 34 in FIG. 1D. The fourth decoder 400 also preferably outputs a single texel value of the origin texel (0, 0), see texel 36 in FIG. 1D.

This means that if all texels 30-36 of a bilinear patch 20 are inside the boundary of a texel block 10 as in FIG. 1A, the output from the first decoder 100 is selected by the value selector 500. If two texels 30, 34 (30, 32) are in one texel block 10 and two 32, 36 (34, 36) are in a neighboring texel block 12 (14) as in FIGS. 1B and 1C, the texel values of the left 30, 34 or upper 30, 32 two texels are obtained from the first decoder 100 and the texel values from the two right 32, 36 or lower 34, 36 texels come from the second decoder 200. Finally, if all four texels 30-36 are in different texel blocks 10-16 as in FIG. 1D, the value selector 500 selects the texel value for the upper left texel 30 from the first decoder 100, the texel value for the upper right texel 32 from the second decoder 200, the texel value for the lower right texel from the third decoder 300 and the texel value for the lower left texel 36 from the fourth decoder 400. In this way all four texels 30-36 of a bilinear patch 20 can be obtained in a single clock cycle, with the advantage that the second to fourth decoders 200, 300, 400 can be implemented using very little hardware.

From the equation $$X(x, y) = \text{round}\left(X_0 + \frac{1}{4}(X_H - X_0)x + \frac{1}{4}(X_V - X_0)y\right),$$

it follows that the texel in the origin (0, 0) is especially simple to calculate $$X(0, 0) = \text{round}\left(X_0 + \frac{1}{4}(X_H - X_0)0 + \frac{1}{4}(X_V - X_0)0\right) = X_0.$$

Figure 6:
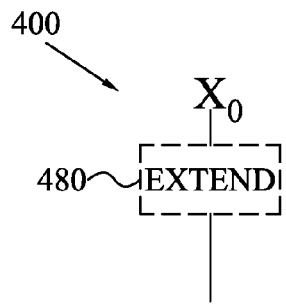
FIG. 6 is a hardware implementation example of the fourth decoder in FIG. 3.

As discussed above, the fourth decoder is preferably configured to only decode texels at origin. This means that the circuitry of the fourth decoder can be made extremely simple. FIG. 6 illustrates the circuitry of the fourth decoder 400 for one of the color components. As is seen from the figure, the only structure is an optional but preferred extender 480 that is configured to extend the input first color codeword $X_0$ to a defined bit length, preferably eight bits. As is further disclosed herein in connection with FIG. 10, such an extender 480 can be implemented without any hardware structures and instead only with wires from where the respective color components are stored to the output of the fourth decoder 400. Therefore, the fourth decoder 400 can be implemented without any gates.

The third decoder 300 should, according to the discussion above, preferably handle texels at the position (3, 0):

$$X(3, 0) = \text{round}\left(X_0 + \frac{1}{4}(X_H - X_0) \times 3 + \frac{1}{4}(X_V - X_0) \times 0\right).$$

The last term does not contribute and can be removed. In order to remove the round( ) operator, the result can be calculated in units of (¼), add two and shift right two times, indicated by >>2: $X(3,0)=((X_0<<2)+(X_H-X_0)\times 3+2)>>2$ Multiplication by three can be exchanged by adding the number to a shifted version of itself: $3t=2t+t=(t<<1)+t$ with $t=X_H-X_0$. The equation can therefore be written as $X(3,0)= ((X_0<<2)+(t<<1)+t+2)>>2$.

In each adder, there is the possibility of adding 1 by setting carry in =1 instead of 0. Hence, the addition of 2 can be replaced by changing the two adders this way. In the equation below +! is used to indicate an adder having carry in set to one: $X(3,0)=((X_0<<2)+!(t<<1)+!t)>>2$. Expressed differently $$X(3, 0) = \text{round}\left(X_0 + \frac{1}{4}(X_H - X_0) \times 3 + \frac{1}{4}(X_V - X_0) \times 0\right)$$
$$= \text{round}\left(\frac{1}{4}X_0 + \frac{3}{4}X_H\right).$$

In similarity to above, the equation can be written as $X(3,0)= (X_0+!((X_H<<1)+!X_H))>>2$. This expression is more easily implemented in hardware as compared to the above presented one.

Shift operators can be implemented by connecting wires differently. The only remaining operations needed to calculate X(3,0) are three additions.

Figure 7:
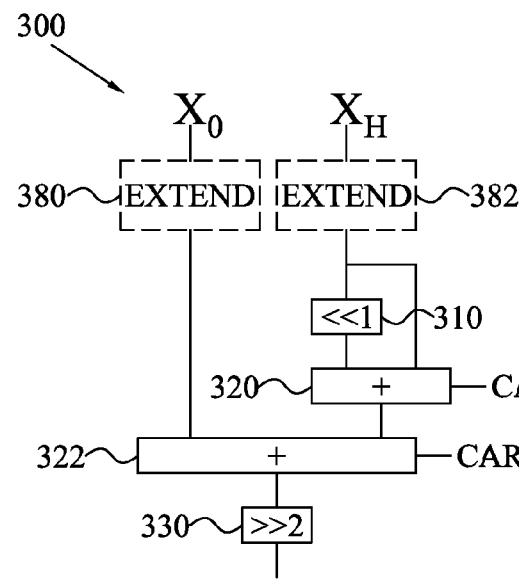
FIG. 7 is a hardware implementation example of the third decoder in FIG. 3.

FIG. 7 illustrates an embodiment of the circuitry of the third decoder 300. The third decoder 300 comprises a left shift operator 310 for shifting the second color codeword $X_H$ one bit position to the left to get a left-shifted bit sequence. The left shift operator 310 is connected to a first adder 320 having carry in set to one. This first adder 320 adds the left-shifted bit sequence to the second color codeword $X_H$. The resulting output is added to the first color codeword $X_0$ in a second adder 322 having carry in set to one and being connected to the first adder 320. Finally, the second adder 322 is connected to a right shift operator 330 configured to shift the bit sequence corresponding to the output of the second adder 322 two bit positions to the right to form the final output of third decoder 300, i.e. the texel value X(3,0).

In an optional but preferred embodiment, the first color codeword $X_0$ and the second color codeword $X_H$ are preferably first extended or expanded from six or seven bits into eight bits. As a consequence a first extender 380 is preferably arranged connected to the second adder 322 and configured to extend the first color codeword $X_0$ into a pre-defined bit size, preferably eight bits. A second extender 382 is preferably arranged connected to the left shift operator 310 and the first adder 320 and is configured to extend or expand the second color codeword $X_H$ into the pre-defined bit size, i.e. preferably eight bits.

Figure 10:
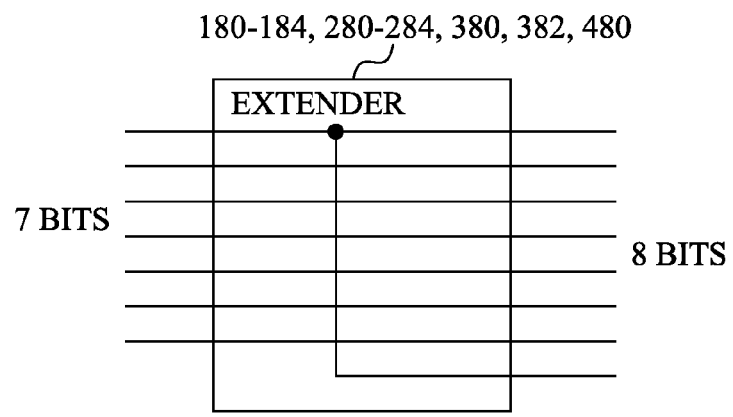
FIG. 10 is a hardware implementation example of a seven-to-eight bit extender.

An extender can be implemented very easily by simple wiring so that the k most significant bits of a l-bit sequence (k<l) are copied to the k least significant bits to get a l+k-bit sequence. FIG. 10 is a schematic illustration of an implementation of the first and second extenders 380, 382 suitable for the green color component. As is seen in the figure, the most significant bit of the input 7-bit sequence is copied to the least significant bit position to get an output 8-bit sequence. For the red and blue components the two most significant bits are copied to the two least significant bit positions to go from a 6-bit sequence to an 8-bit sequence.

With the previous mentioned bit size for the encoded texel block, i.e. six bits per color codeword for the red and blue components and seven bits per color codeword for the green component and usage of the two extenders, the hardware circuitry of the third decoder 300 can be implemented with a total of 250.8 gates, if each adder costs 4.4 gates per bit:

R/G/B: 1 9-bit adder→9×4.4=39.6 gates
1 10-bit adder→10×4.4=44 gates
Total: 3×83.6=250.8 gates No clampers are needed for the third decoder 300 as in a preferred implementation of the first and second decoders, which is further discussed herein.

Figure 8:
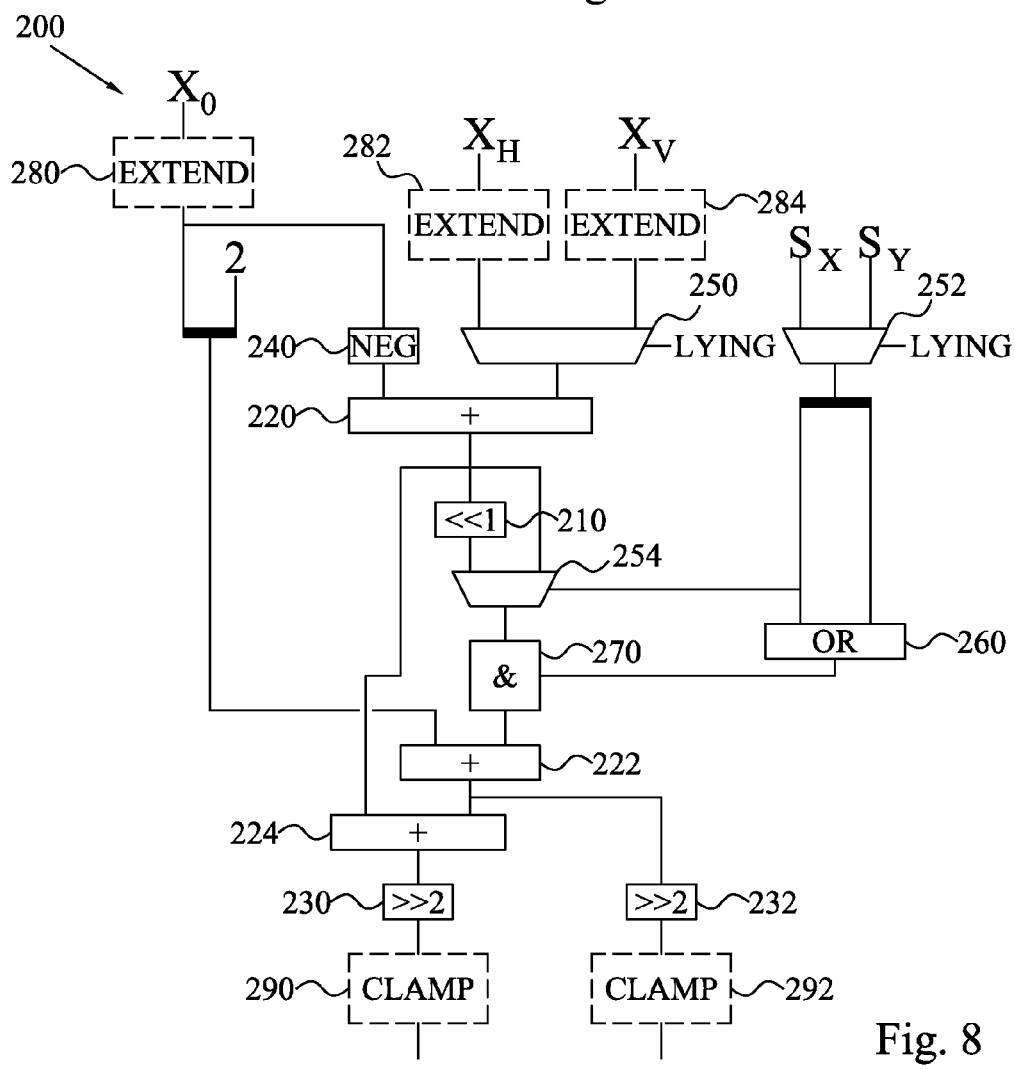
FIG. 8 is a hardware implementation example of the second decoder in FIG. 3.

FIG. 8 illustrates an embodiment of a hardware implementation of the second decoder 200. The second decoder 200 comprises a first multiplexor 250 configured to output one of the second color codeword $X_H$ and the third color codeword $X_V$. The selection of color codeword is dependent on whether half of the four texels are positioned in the first row or first column inside the boundary of the texel block, the encoded texel block of which is input to the second decoder 200. If the two pixels are positioned in the first row, the second color codeword $X_H$ is output from the first multiplexor 250 otherwise the third color codeword $X_V$ is output. A negation operator 240 is configured to negate the first color codeword $X_0$. A first adder 220 is connected to the first multiplexor 250 and the negation operator 240 and adds the output from these units 240, 250 to form the difference $X_H-X_0$ or $X_V-X_0$. In an alternative implementation, the negation operator 240 is replaced by a NOT operator with the first adder 220 being an adder with carry in set to one. Usage of a NOT operator together with an adder with carry in set to one is generally preferred over a negation operator with a normal adder in terms of hardware complexity.

A left shift operator 210 is connected to the first adder 220 and is configured to shift the bit sequence corresponding to the adder output one bit position to the left.

A second multiplexor 252 is configured to output one of a row coordinate and a column coordinate of a texel. This texel is the first texel of the two texels present in the texel block, the encoded texel block of which is input to the second decoder 200. In the figure $S_X$ denotes the column coordinate and $S_Y$ denotes the row coordinate of this texel. If the two texels are positioned in the first row, the column coordinate $S_X$ is output from the second multiplexor 252 otherwise the row coordinate $S_Y$.

A third multiplexor 254 is connected to the left shift operator 210 and the first adder 220. The third multiplexor 254 selects between $2\times(X_{H/V}-X_0)=2d$, i.e. the output from the left shift operator 210, and $(X_{H/V}-X_0)=d$, i.e. the output of the first adder 220. The selection is made based on the value of the most significant bit of the row or column coordinate output from the second multiplexor 252.

An OR operator 360 is connected to the second multiplexor 352 and is configured to perform an OR operation on the most significant bit and the least significant bit of the row or column coordinate from the second multiplexor 352. The OR operator 360 and the third multiplexor 254 are further connected to an AND operator 270. This AND operator 270 performs an AND operation of the multiplexor output bitwise with the single bit from the OR operator 260. The result here is that the multiplexor output is preserved if the OR output is $1_{bin}$ and the output from the AND operator 270 is zero if the OR output is $0_{bin}$. Hence, the output from the AND operator 270 is 2d, d or 0.

A second adder 222 is connected to the AND operator 270 and is configured to add the output of the AND operator 270 and a bit sequence having $10_{bin}$ as the least two significant bits preceded by the first color codeword $X_0$. This bit sequence corresponds to $f=4\times X_0+2$, which can be implemented by shifting the bit sequence of the first color codeword $X_0$ two bit positions to the left and inserting $2=10_{bin}$ as the last two bits, which otherwise are zero after the shift. The output from the second adder 222 is therefore 2d+f, d+f or f.

A third adder 224 is connected to the first adder 220 and the second adder 222 and is configured to add the outputs from these adders 220, 222. This third adder 224, hence, gives the result 3d+f, 2d+f or d+f. A first right shift operator 230 is connected to the third adder 224 and is configured to shift the bit sequence from the third adder 224 two bit positions to the right to get the texel value of the lower or right texel of the two texels in the first column or the first row in the bilinear patch. A second right shift operator 232 is connected to the second adder 222 and shifts the adder output two bit positions to the right to form the texel value of the upper of the left texel of the two texels in the first column or the first row.

The input color codewords $X_0$, $X_H$, $X_V$ are preferably expanded from six or seven bits into eight bits in similarity to the third decoder in FIG. 7. As a consequence, optional but preferred extenders 280, 282, 284 are preferably arranged at the input terminals to thereby have a first extender 280 configured to extend the first color codeword $X_0$ prior addition of $10_{bin}$ as the two least significant bits to form, in this case, a 10-bit sequence. The first extender 280 is also connected to the negation operator 240. A second 282 and third 284 extender are connected to the first multiplexor 250 and extends the second $X_H$ and the third $X_V$ color codewords, respectively.

In an optional implementation the right shift operators 230, 232 are preferably connected to a respective clamper or clamp operator 290, 292. These clampers 290, 292 are configured to clamp the output from the right shift operators 230, 232 between a minimum texel value and a maximum texel value. Thus, the clampers 290, 292 make sure that the output bit sequence from the second decoder 200 is within an allowed value interval. An example of such an allowed value interval is from 0 to 255 if the output sequences from the second decoder 200 should be of 8 bits.

Figure 9:
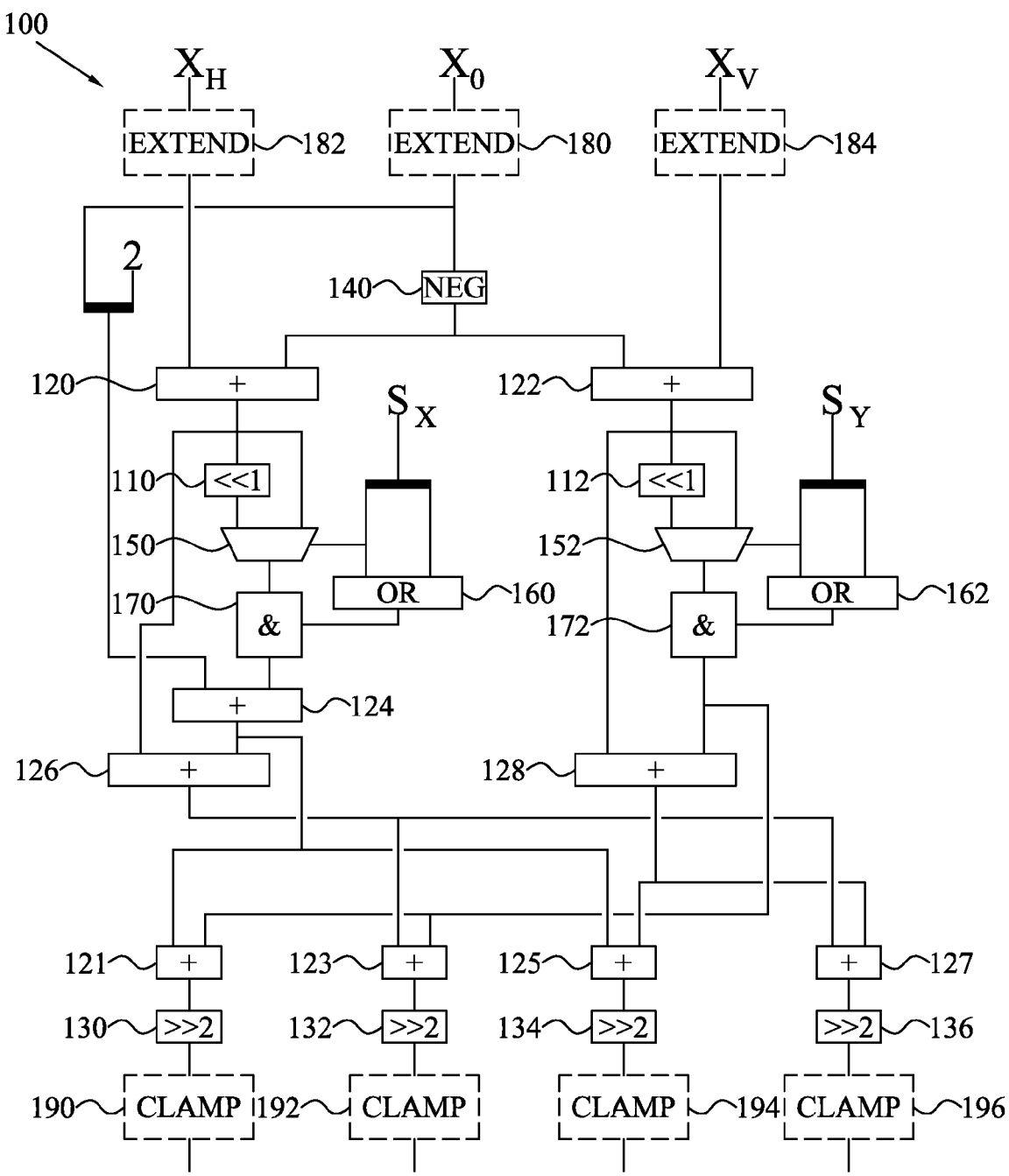
FIG. 9 is a hardware implementation example of the first decoder in FIG. 3.
Figure 11:
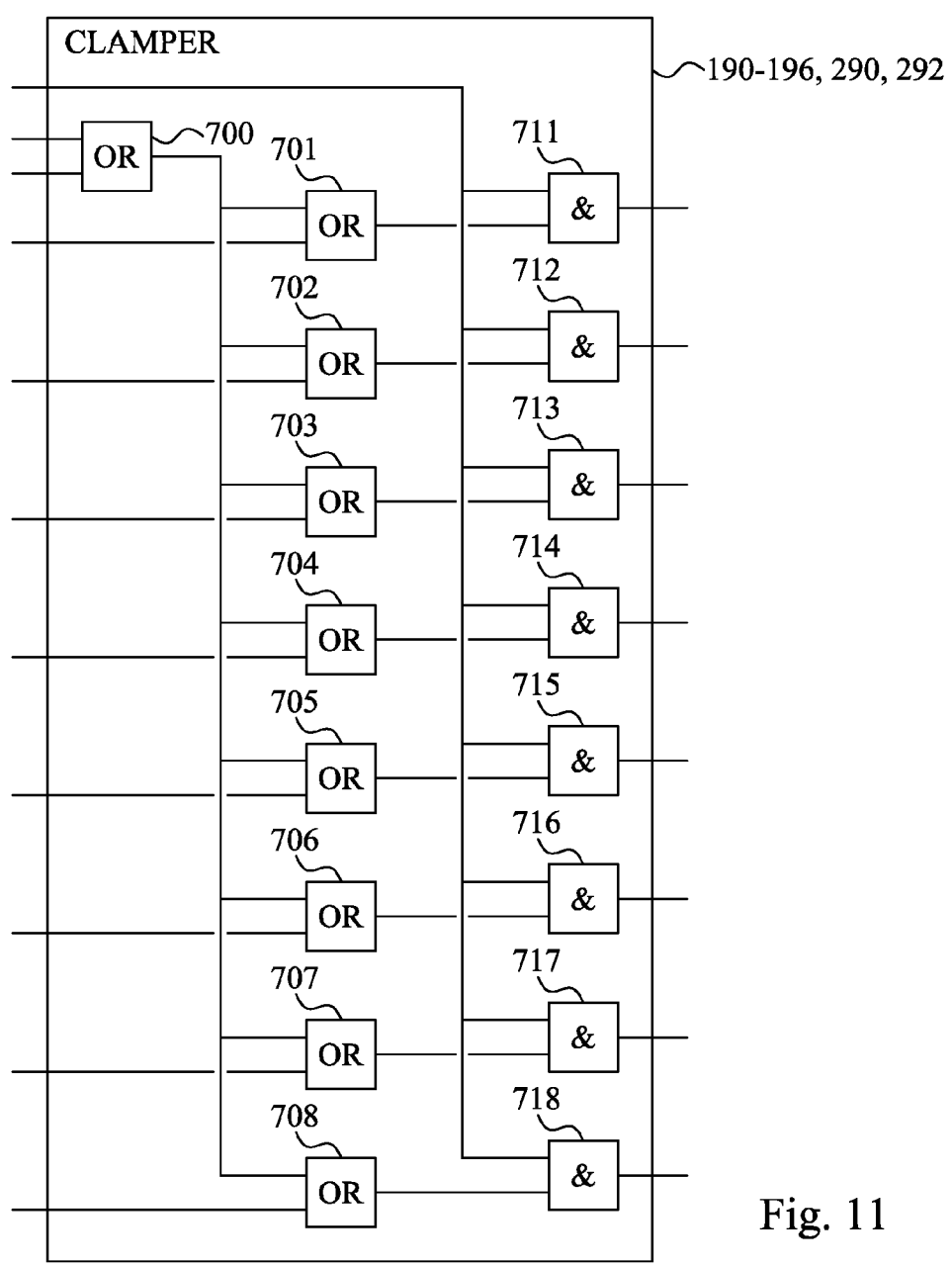
FIG. 11 is a hardware implementation of a clamper.

FIG. 11 illustrates an example of a hardware implementation of a clamper 190-196, 290, 292, such as employed in the second decoder of FIG. 8 or the first decoder of FIG. 9. This clamper embodiment is designed to clamp a 11-bit sequence potentially representing a value in the interval of [−1024, 1023] to a 8-bit sequence representing a value in the interval of [0, 255]. The clamper 190-196, 290, 292 comprises eight OR operators 701-708 each receiving one of the eight least significant bits of the input bit sequence. The other respective inputs to the OR operators 701-708 are connected to the output of another OR operator 700. This OR operator 700 receives the two most significant bits of the input bit sequence. The outputs of the eight OR operators 701-708 are each connected to a respective AND operator 711-718. The other respective input of the AND operators 711-718 receives the sign bit of the input bit sequence.

Figure 12:
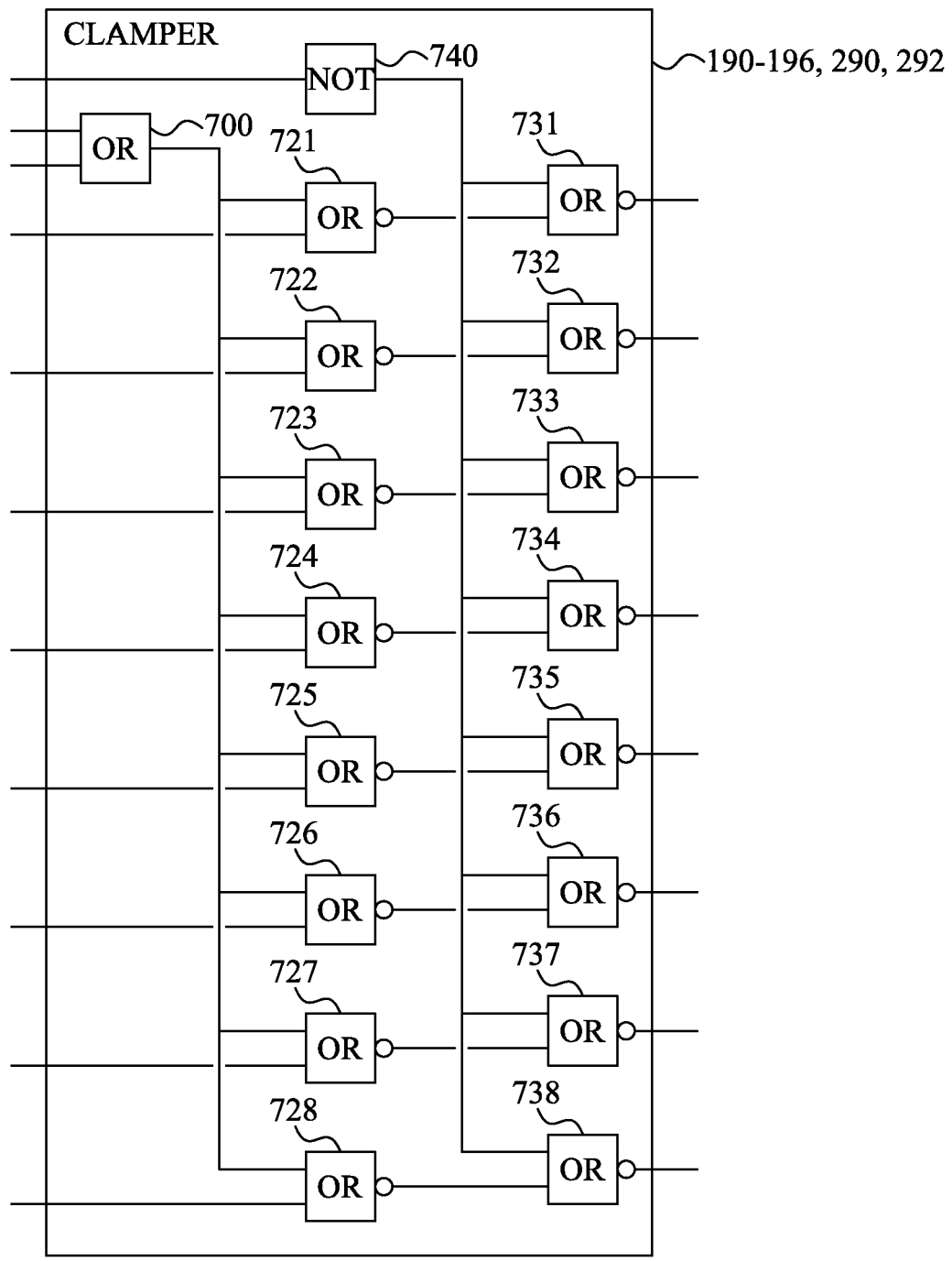
FIG. 12 is another hardware implementation of a clamper.

An alternative implementation embodiment for the clamper 190-196, 290, 292 is illustrated in FIG. 12. In this embodiment, the eight OR operators are replaced by eight NOR operators 721-724. Correspondingly, the eight AND operators of FIG. 11 are also replaced by eight NOR operators 731-738. In addition, a NOT operator 740 is connected between the eight NOR operators 731-738 and the input for the sign bit of the input bit sequence.

The cost for implementing the hardware embodiment illustrated in FIG. 12 is:
16 NOR→16×1=16 gates
1 OR→1×1.5=1.5 gates
1 NOT→1×0.5=0.5 gates
Total: 16+1.5+0.5=18 gates The number of gates for the implementation example of the second decoder 200 in FIG. 8, excluding the clampers, is:
R/G/B: 1 8-bit adder→8×4.4=35.2 gates
1 11-bit adder→11×4.4=48.4 gates
1 12-bit adder→12×4.4=52.8 gates
1 8-bit mux→8×2.2=17.6 gates
1 10-bit mux→10×2.2=22 gates
1 2-bit mux→2×2.2=4.4 gates
1 1-bit OR→1×1.5=1.5 gates
1 10-bit AND→10×1.5=15 gates
1 8-bit NOT→8×0.5=4 gates
Total: 3×200.9=602.7 gates Finally FIG. 9 is an example of a hardware implementation of the first decoder 100. The first decoder 100 comprises a negation operator 140 configured to negate the first color codeword $X_0$. A first adder 120 is connected to the negation operator 140 and adds the negated first color codeword to the second color codeword $X_H$ to get $g=X_H-X_0$. A second adder 122 is also connected to the negation operator 140 and adds the negated first color codeword to the third color codeword $X_V$ to get $h=X_V-X_0$. In an alternative implementation, the negation operator 140 is replaced by a NOT operator. The first adder 120 and the second adder 122 then both have carry in set to one.

A first left shift operator 110 is connected to the first adder 120 and shifts the adder output one bit position to the left get a left-shifted bit sequence corresponding to 2g. A second left shift operator 112 is connected to the second adder 122 and shifts the adder output one bit position to the left to get the bit sequence of 2h. A first multiplexor 150 is connected to the first left shift operator 110 and the first adder 120 and is configured to select between g and 2g based on the most significant bit of a column coordinate $S_X$. A second multiplexor 152 is correspondingly connected to the second left shift operator 112 and the second adder 122 and selects between h and 2h based on the most significant bit of a row coordinate $S_Y$. The column and row coordinates are the coordinates of the top left texel in the 2×2 bilinear patch, i.e. texel 30 in FIGS. 1A to 1D.

A first OR operator 160 performs an OR operation on the most significant bit and the least significant bit of the column coordinate $S_X$. A second OR operator 162 performs an OR operation on the most significant bit and the least significant bit of the row coordinate $S_Y$. The first OR operator 160 and the first multiplexor 150 are connected to a first AND operator 170 that performs a bitwise AND operation on the multiplexor output with the single bit from the first OR operator 160. The output from the first AND operator 170 is therefore 2g, g or 0. A second AND operator 172 is connected to the second multiplexor 152 and the second OR operator 162. The second AND operator 172 performs a bitwise AND operation on the multiplexor output with the bit from the second OR operator 162 to get an output of 2h, h or 0.

A third adder 124 is connected to the first AND operator 124 and adds the adder output to a bit sequence having $10_{bin}$ as the two least significant bits preceded by the first color codeword. This bit sequence corresponds, as has been previously described, $f=4X_0+2$. The adder output is therefore 2g+f, g+f or f. A fourth adder 126 is connected to the first adder 120 and the third adder 124 and is configured to add the outputs from these adders 120, 124 to get 3g+f, 2g+f or g+f. A fifth adder 128 is connected to the second adder 122 and the second AND operator 172 and adds the outputs from these two units 122, 172 to get 3h, 2h or h.

A sixth adder 121 is connected to the third adder 124 and the second AND operator 172 and is configured to add the outputs from these units 124, 172. A first right shift operator 130 is connected to the sixth adder 121 and is configured to shift the bit sequence of the adder output two bit positions to the right to get texel value of texel 30 in FIG. 1A.

A seventh adder 123 is connected to the fourth adder 126 and the second AND operator 172 and is configured to add the outputs form these units 126, 172. A second right shift operator 132 is connected to the seventh adder 123 and is configured to shift the bit sequence of the adder output two bit positions to the right to get texel value of texel 32 in FIG. 1A.

An eighth adder 125 is connected to the third adder 124 and the fifth adder 128 and is configured to add the outputs form these adders 124, 128. A third right shift operator 134 is connected to the eighth adder 125 and is configured to shift the bit sequence of the adder output two bit positions to the right to get texel value of texel 34 in FIG. 1A.

A ninth adder 127 is connected to the fourth adder 126 and the fifth adder 128 and is configured to add the outputs form these adders 126, 128. A fourth right shift operator 136 is connected to the fourth adder 127 and is configured to shift the bit sequence of the adder output two bit positions to the right to get texel value of texel 36 in FIG. 1A.

In an optional but preferred implementation the input color codewords $X_0$, $X_H$, $X_V$ are first extended or expanded from six or seven bits into eight bits. As a consequence a first bit extender 180 is preferably arranged connected to the negation operator 140 and further configured to extend or expand the first color codeword $X_0$ into the pre-defined bit sequence, preferably eight bits, before $10_{bin}$ is added as least significant bits to get a 10-bit sequence. A second extender 182 is correspondingly arranged connected to the first adder 120 and configured to extend the second color codeword $X_H$. Finally, a third extender 184 is connected to the second adder 122 and is configured to extend the third color codeword $X_V$.

In an optional implementation each right shift operator 130-136 is preferably connected to a respective clamper or clamp operator 190-196. These clampers 190-196 are configured to clamp the output from the right shift operators 130-136 between a minimum texel value and a maximum texel value. Thus, the clampers 190-196 make sure that the output bit sequence from the first decoder 100 is within an allowed value interval. An example of such an allowed value interval is from 0 to 255 if the output sequences from the first decoder 100 should be of 8 bits.

The number of gates for the implementation example of FIG. 8 excluding the optional clampers 190-196 is:

R/G/B: 2 8-bit adder→16×4.4=70.4 gates
1 10-bit adder→10×4.4=44 gates
1 11-bit adders→11×4.4=48.4 gates
5 12-bit adders→60×4.4=264 gates
2 10-bit mux→20×2.2=44 gates
2 1-bit OR→2×1.5=3 gates
2 10-bit AND→20×1.5=30 gates
1 8-bit NOT→8×0.5=4 gates
Total: 3×507.8=1523.4 gates The four decoders of the decoding system can therefore be implemented with only 0+250.8+602.7+1523.4=2376.9 gates excluding the clampers.

A traditional implementation with four identical decoders as suggest in the prior art [3] would look very much like the first decoder in FIG. 9. The only difference would be that only one texel would be needed in the output instead of four as in the figure. Hence, the four adders 121, 123, 125, 127 would then be replaced by two four-way multiplexors followed by an adder. This would cost 6 adders, 4 multiplexors and two AND operators per color channel. This means that with four decoder and three different color components the hardware cost or complexity according to the prior art would have been:

6×3×4=72 adders
4×3×4=48 multiplexors
2×3×4=24 AND operators

This should be compared to the disclosed implementation embodiments of FIGS. 6-8 needing (9+3+2+0)×3=42 adders
(2+3+0+0)×3=15 multiplexors
(2+1+0+0)×3=9 AND operators The number of adders has therefore been reduced from 72 to 42, or by 42%. The multiplexors have been decreased even more in relative terms, from 48 to 15, or by 69%.

Figure 13:
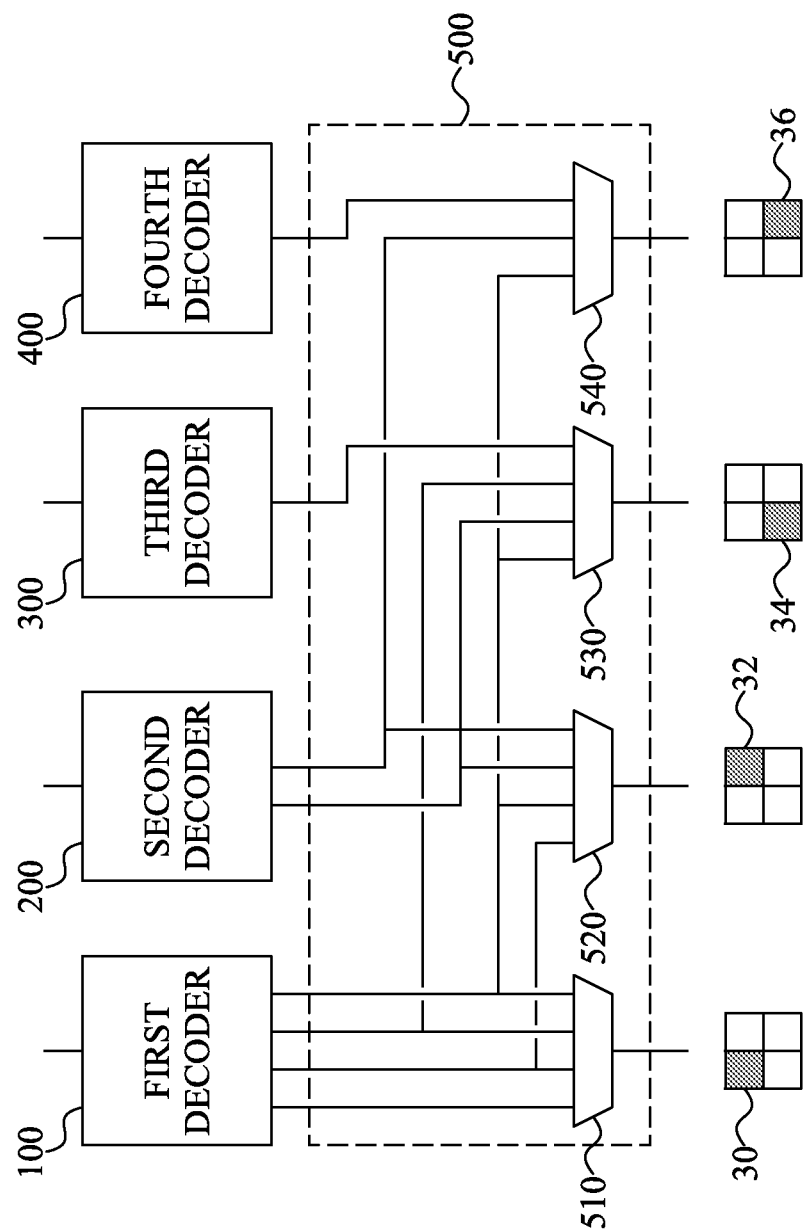
FIG. 13 is a hardware implementation example of the value selector of FIG. 3.

FIG. 13 illustrates an embodiment of a hardware implementation of the value selector 500. In this embodiment the value selector 500 comprises four multiplexors 510 each one outputting a texel value of a texel 30-36 of the bilinear patch. The first multiplexor 510 is connected to the four outputs of the first decoder 100 and selects one of the four bit sequences as the texel value of the first texel 30 in the bilinear patch. The second multiplexor 520 is connected to second and fourth output of the first decoder 100 and the two outputs of the second decoder 200. This second multiplexor 520 outputs the texel value of the second texel 32 in the bilinear patch. A third multiplexor 530 is connected to the third and fourth outputs of the first decoder 100, the first output of the second decoder 200 and the single output of the third decoder 300. The third multiplexor 530 outputs the texel value for the third texel 34 in the bilinear patch. Finally, the fourth multiplexor 540 is connected to the fourth output of the first decoder 100, the second output of the second decoder 200 and the single output of the fourth decoder 400. The fourth multiplexor 540 selects and outputs the texel value of the fourth texel 36 in the bilinear patch.

The position of the bilinear patch relative a texel block border dictates which bit sequences are output from the multiplexors 510-540. Thus, in the situation illustrated in FIG. 1A, the bit sequences from the four outputs of the first decoder 100 are selected by the multiplexors 510-540. In more detail, the first multiplexor 510 outputs the bit sequence from the first output of the first decoder 100, the second multiplexor 520 outputs the bit sequence from the second output with the third 530 and fourth 540 multipelxors outputting the bit sequences from the third and fourth decoder outputs, respectively. A bilinear patch situated as illustrated in FIG. 1B implies that the first multiplexor 510 selects the bit sequence of the second output of the first decoder 100. The second multipelxor 520 selects the bit sequence of the first output of the second decoder 200. The third decoder 300 selects the bit sequence of the fourth output from the first decoder 100 and the fourth decoder 400 selects the bit sequence from the second output of the second decoder 200. The concept can then be applied in a similar way to the two other patch positions as illustrated in FIGS. 1C and 1D.

The cost in terms of number of gates of implementing the embodiment of the value selector 500 as illustrated in FIG. 13 is:

3 8-bit 4-way mux→24×6.6=158.4 gates
1 8-bit 3-way mux→8×4.4=35.2 gates
Total: 158.4+35.2=193.6 gates The total cost for the decoders and value selector, including the clampers, is 2376.9+6×18+193.6=2678.5 gates.

If the clampers of the first and second decoders as illustrated in FIGS. 8 and 9 would have been omitted and instead replaced by four clampers, each connected to one of the multiplexors 510-540 of the value selector 500, the cost of implementing the value selector 500 would increase since then the three 11-bit 4-way multiplexors and one 11-bit 3-way multiplexor would be needed resulting in a cost of 266.2 gates instead of 193.6 gates.

The pixel calculator of the decoding system can be implemented in hardware according to techniques well-known in the art. In more detail, assume that the four texel values, in the case of bilinear filtering, from the value selector are denoted A, B, C and D. The pixel calculator then calculates the pixel value as:

$$\text{pixel value} = A(1-dx)(1-dy) + Bdx(1-dy) + C(1-dx)dy + Ddxdy$$

where dx is the distance along the x-axis between the midpoint of texel A and the sample point for the pixel and dy is the corresponding distance along the y-axis between the midpoint of texel A and the sample point for the pixel.

The above described equation is performed in parallel for the red, green and blue color components. A hardware implementation can then be defined based on the equation. For instance, assume that the position of the sample point can be expressed with three binary decimals, e.g. the dx position can assume the following values [0.000, 0.125, 0.250, 0.375, 0.500, 0.625, 0.750, 0.875]. In such a case, the position can be defined in eights so that the values above can be represented by [0, 1, 2, 3, 4, 5, 6, 7]. The equation above can then be rewritten as:

$$\text{pixel value} = (A(8-DX)(8-DY) + BDX(8-DY) + C(8-DX)DY + DDXDY) \gg 6$$

where $DX = 8 \times dx$ and $DY = 8 \times dy$ and DX, DY are integers between 0 and 7.

Investigating the second term 8DX(8−DY) one realizes that both DX and (8−DY) are integers between 0 and 8. In order to represent eight, four bits are required. A multiplication operator that handles four bits in each input and outputs an 8-bit sequence can be used. However, the largest number that the multiplication operator can output is 7×8=56 so that only the six least significant bits are needed from the output.

The output from the multiplication operator should then be multiplied by the texel value B, preferably a number between 0 and 255. This multiplication can be handled by a multiplication operator taking two 8-bit inputs and outputs a 16-bit bit sequence. However, only the fourteen least significant bits from the multiplication operator are needed since the largest possible number is $56 \times 255 < 2^{14}$.

A corresponding implementation is then performed for the other terms in the equation and the outputs from the respective final multiplication operators are added and shifted six steps to the right in order to get the final 8-bit pixel value.

The above described implementation examples should merely be seen as preferred but non-limiting embodiments of how the units of the decoding system can be implemented in hardware. Various variants thereof are possible and within the scope of the invention. The important feature is though that the circuitry of the including decoders are different with increasing complexity and that each decoder is configured to handle and output the texel value(s) of one or more texels at predefined positions in the patch.

Figure 14:
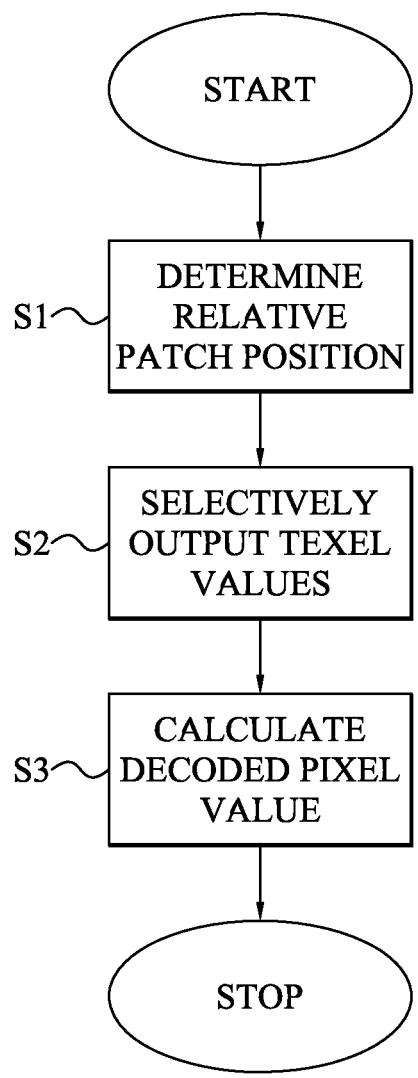
FIG. 14 is a flow diagram illustrating a decoding method according to an embodiment.

FIG. 14 is a flow diagram illustrating a method of generating a decoded pixel by decoding at least one encoded texel block. The method starts in step S1 there the position of at least N texel values, i.e. a patch, relative a texel block border is determined. A respective encoded texel block, either the same encoded texel block or different encoded texel blocks depending on the determined relative patch position, is input to N decoders to get decoded texel values. A next step S2 selectively outputs at least N texel values from at least one of the N decoders. The particular at least N texel values to select in step S2 and from which decoder(s) they are fetched is determined based on the relative patch position obtained in step S1. In addition, each of the N decoders have a respective circuitry that is different from the circuitry of the N−1 other decoders. The final step S3 calculates a decoded pixel value based on at least N texel values selected in step S2, preferably as a linear combination of these at least N texel values. The method then ends or starts anew in step S1 for the purpose of generating a new decoded pixel.

Step S2 preferably involves selectively outputting all N texel values from a first decoder of the N decoders if the N texels are positioned inside the boundary of a texel block. If however half of the N texels are positioned inside one texel block and the remaining half of the texels are instead found inside a neighboring texel block, half of the N texel values are preferably selected from the output of the first decoder with the remaining half from a second decoder.

In a preferred embodiment N=4. If the four texels are then positioned so that each texel is found in a separate texel block, step S2 preferably involves selecting one respective texel value from each of the four decoders.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] U.S. Pat. No. 5,956,431
[2] Ström and Möller, "iPACKMAN: High-Quality, Low-Complexity Texture Compression for Mobile Phones", Graphics Hardware, 2005, ACM Press, pp. 63-70
[3] Ström and Pettersson, "ETC2: Texture Compression using Invalid Combinations", Graphics Hardware, 2007, ACM Press, pp. 49-54
[4] International application no. WO 2006/126949

The invention claimed is:

1. A decoding system for generating a decoded pixel based on at least one encoded texel block, said decoding system comprises:
   N different decoders, each having a circuitry having a level of complexity that is different from the level of complexity of the circuitry of the other N−1 decoders and each is configured to decode an encoded texel block to generate at least one respective texel value;
   a value selector connected to said N decoders and configured to selectively output at least N texel values from at least one of said N decoders based on the positions of the at least N texels associated with said at least N texel values relative a boundary of a texel block comprising at least one of said at least N texels; and
   a pixel calculator configured to calculate a decoded pixel value of said decoded pixel based on said at least N texel values selectively output by said value selector.

2. The decoding system according to claim 1, wherein said value selector is configured to selectively output N texel values from a first decoder of said N decoders if the N texels associated with said N texel values are positioned inside said boundary of a texel block.

3. The decoding system according to claim 1, wherein said value selector is configured to selectively output a half of N texel values from a first decoder of said N decoders and a remaining half of said N texel values from a second decoder of said N decoders if half of the N texels associated with said N texel values are positioned inside said boundary of said texel block and half of said N texels are positions inside the boundary of a neighboring texel block.

4. The decoding system according to claim 1, wherein N is equal to four and said value selector is configured to selectively output a first texel value of said four texel values from a first decoder of said four decoders, a second texel value of said four texel values from a second decoder of said four decoders, a third texel value of said four texel values from a third decoder of said four decoders and a fourth texel value of said four texel values from a fourth decoder of said four decoders if one of said four texels is positioned inside said boundary of said texel block and each of the remaining three texels is positioned inside the boundary of a respective neighboring texel block.

5. The decoding system according to claim 1, wherein N is equal to four and
   a first decoder of said four decoders has a first circuitry and is configured to decode an encoded texel block to generate four texel values;
   a second decoder of said four decoders has a second circuitry and is configured to decode an encoded texel block to generate two texel values;
   a third decoder of said four decoders has a third circuitry and is configured to decode an encoded texel block to generate one texel value; and
   a fourth decoder of said four decoders has a fourth circuitry and is configured to decode an encoded texel block to generate one texel value.

6. The decoding system according to claim 5, wherein said encoded texel block comprises a first color codeword, a second color codeword and a third color codeword.

7. The decoding system according to claim 6, wherein said fourth decoder comprises at least one wire to output said first color codeword.

8. The decoding system according to claim 6, wherein said third decoder comprises:
- a left shift operator configured to shift a bit sequence corresponding to said second color codeword one bit position to the left to form a left-shifted bit sequence;
- a first adder having carry in set to one and being connected to said left shift operator and configured to add said second color codeword and said left-shifted bit sequence;
- a second adder having carry in set to one and being connected to said first adder and configured to add the output of said first adder and said first color codeword; and
- a right shift operator connected to said second adder and configured to shift a bit sequence corresponding to the output of said second adder two bit positions to the right to form a right-shifted sequence.

9. The decoding system according to claim 6, wherein said second decoder comprises:
- a first multiplexor configured to output one of said second color codeword and said third color codeword based on whether half of four texels are positioned in a row or column inside said boundary of said texel block;
- a negation operator configured to negate said first color codeword;
- a first adder connected to said first multiplexor and said negation operator and configured to add the output of said first multiplexor and said negated first color codeword;
- a left shift operator connected to said first adder and configured to shift a bit sequence corresponding to the output of said first adder one bit position to the left to form a left-shifted bit sequence;
- a second multiplexor configured to output one of a row coordinate and a column coordinate of a texel based on whether said half of four texels are positioned in a row or column inside said boundary of said texel block;
- a third multiplexor connected to said left shift operator and said first adder and configured to output one of said output of said first adder and said left-shifted bit sequence based on the most significant bit of the output of said second multiplexor;
- an OR operator connected to said second multiplexor and configured to receive said most significant bit of said output of said second multiplexor and the least significant bit of said output of said second multiplexor;
- an AND operator connected to said third multiplexor and said OR operator and configured to receive the output of said third multiplexor and the output of said OR operator;
- a second adder connected to said AND operator and configured to add the output of said AND operator and a bit sequence having $10_{bin}$ as the two least significant bits preceded by said first color codeword;
- a third adder connected to said first adder and said second adder and configured to add said output of said first adder and the output of said second adder;
- a first right shift operator connected to said third adder and configured to shift the bit sequence corresponding to the output of said third adder two bit positions to the right to form a first right-shifted sequence; and
- a second right shift operator connected to said second adder and configured to shift the bit sequence corresponding to said output of said second adder two bit positions to the right to form a second right-shifted sequence.

10. The decoding system according to claim 6, wherein said second decoder comprises:
- a first multiplexor configured to output one of said second color codeword and said third color codeword based on whether half of four texels are positioned in a row or column inside said boundary of said texel block;
- a not operator configured to negate said first color codeword;
- a first adder having carry set to one connected to said first multiplexor and said not operator and configured to add the output of said first multiplexor and said negated first color codeword;
- a left shift operator connected to said first adder and configured to shift a bit sequence corresponding to the output of said first adder one bit position to the left to form a left-shifted bit sequence;
- a second multiplexor configured to output one of a row coordinate and a column coordinate of a texel based on whether said half of four texels are positioned in a row or column inside said boundary of said texel block;
- a third multiplexor connected to said left shift operator and said first adder and configured to output one of said output of said first adder and said left-shifted bit sequence based on the most significant bit of the output of said second multiplexor;
- an OR operator connected to said second multiplexor and configured to receive said most significant bit of said output of said second multiplexor and the least significant bit of said output of said second multiplexor;
- an AND operator connected to said third multiplexor and said OR operator and configured to receive the output of said third multiplexor and the output of said OR operator;
- a second adder connected to said AND operator and configured to add the output of said AND operator and a bit sequence having $10_{bin}$ as the two least significant bits preceded by said first color codeword;
- a third adder connected to said first adder and said second adder and configured to add said output of said first adder and the output of said second adder;
- a first right shift operator connected to said third adder and configured to shift the bit sequence corresponding to the output of said third adder two bit positions to the right to form a first right-shifted sequence;
- a second right shift operator connected to said second adder and configured to shift the bit sequence corresponding to said output of said second adder two bit positions to the right to form a second right-shifted sequence.

11. The decoding system according to claim 6, wherein said first decoder comprises:
- a negation operator configured to negate said first color codeword;
- a first adder connected to said negation operator and configured to add said second color codeword and said negated first color codeword;
- a second adder connected to said negation operator and configured to add said third color codeword and said negated first color codeword;
- a first left shift operator connected to said first adder and configured to shift a bit sequence corresponding to the output of said first adder one bit position to the left to form a first left-shifted bit sequence;

a second left shift operator connected to said second adder and configured to shift a bit sequence corresponding to the output of said second adder one bit position to the left to form a second left-shifted bit sequence;

a first multiplexor connected to said first adder and said first left shift operator and configured to output one of said output of said first adder and said first left-shifted bit sequence based on the most significant bit of a column coordinate of a texel;

a second multiplexor connected to said second adder and said second left shift operator and configured to output one of said output of said second adder and said second left-shifted bit sequence based on the most significant bit of a row coordinate of said texel;

a first OR operator configured to receive said most significant bit of said column coordinate and said least significant bit of said column coordinate;

a second OR operator configured to receive said most significant bit of said row coordinate and said least significant bit of said row coordinate;

a first AND operator connected to said first multiplexor and said first OR operator and configured to receive the output of said first multiplexor and the output of said first OR operator;

a second AND operator connected to said second multiplexor and said second OR operator and configured to receive the output of said second multiplexor and the output of said second OR operator;

a third adder connected to said first AND operator and configured to add the output of said first AND operator and a bit sequence having $10_{bin}$ as the two least significant bits preceded by said first color codeword;

a fourth adder connected to said first adder and said third adder and configured to add said output of said first adder and the output of said third adder;

a fifth adder connected to said second adder and said second AND operator and configured to add said output of said second adder and the output of said second AND operator;

a sixth adder connected to said third adder and said second AND operator and configured to add said output of said third adder and said output of said second AND operator;

a seventh adder connected to said fourth adder and said second AND operator and configured to add said output of said fourth adder and said output of said second AND operator;

an eight adder connected to said third adder and said fifth adder and configured to add said output of said third adder and the output of said fifth adder;

a ninth adder connected to said fourth adder and said fifth adder and configured to add said output of said fourth adder and said output of said fifth adder;

a first right shift operator connected to said sixth adder and configured to shift the bit sequence corresponding to the output of said sixth adder two bit positions to the right to form a first right-shifted sequence;

a second right shift operator connected to said seventh adder and configured to shift the bit sequence corresponding to the output of said seventh adder two bit positions to the right to form a second right-shifted sequence;

a third right shift operator connected to said eight adder and configured to shift the bit sequence corresponding to the output of said eight adder two bit positions to the right to form a third right-shifted sequence; and a fourth right shift operator connected to said ninth adder and configured to shift the bit sequence corresponding to the output of said ninth adder two bit positions to the right to form a fourth right-shifted sequence.

12. The decoding system according to claim 6, wherein said first decoder comprises:

a not operator configured to negate said first color codeword;

a first adder having carry in set to one connected to said not operator and configured to add said second color codeword and said negated first color codeword;

a second adder having carry in set to one connected to said not operator and configured to add said third color codeword and said negated first color codeword;

a first left shift operator connected to said first adder and configured to shift a bit sequence corresponding to the output of said first adder one bit position to the left to form a first left-shifted bit sequence;

a second left shift operator connected to said second adder and configured to shift a bit sequence corresponding to the output of said second adder one bit position to the left to form a second left-shifted bit sequence;

a first multiplexor connected to said first adder and said first left shift operator and configured to output one of said output of said first adder and said first left-shifted bit sequence based on the most significant bit of a column coordinate of a texel;

a second multiplexor connected to said second adder and said second left shift operator and configured to output one of said output of said second adder and said second left-shifted bit sequence based on the most significant bit of a row coordinate of said texel;

a first OR operator configured to receive said most significant bit of said column coordinate and said least significant bit of said column coordinate;

a second OR operator configured to receive said most significant bit of said row coordinate and said least significant bit of said row coordinate;

a first AND operator connected to said first multiplexor and said first OR operator and configured to receive the output of said first multiplexor and the output of said first OR operator;

a second AND operator connected to said second multiplexor and said second OR operator and configured to receive the output of said second multiplexor and the output of said second OR operator;

a third adder connected to said first AND operator and configured to add the output of said first AND operator and a bit sequence having $10_{bin}$ as the two least significant bits preceded by said first color codeword;

a fourth adder connected to said first adder and said third adder and configured to add said output of said first adder and the output of said third adder;

a fifth adder connected to said second adder and said second AND operator and configured to add said output of said second adder and the output of said second AND operator;

a sixth adder connected to said third adder and said second AND operator and configured to add said output of said third adder and said output of said second AND operator;

a seventh adder connected to said fourth adder and said second AND operator and configured to add said output of said fourth adder and said output of said second AND operator;

an eight adder connected to said third adder and said fifth adder and configured to add said output of said third adder and the output of said fifth adder;

a ninth adder connected to said fourth adder and said fifth adder and configured to add said output of said fourth adder and said output of said fifth adder;

a first right shift operator connected to said sixth adder and configured to shift the bit sequence corresponding to the output of said sixth adder two bit positions to the right to form a first right-shifted sequence;

a second right shift operator connected to said seventh adder and configured to shift the bit sequence corresponding to the output of said seventh adder two bit positions to the right to form a second right-shifted sequence;

a third right shift operator connected to said eight adder and configured to shift the bit sequence corresponding to the output of said eight adder two bit positions to the right to form a third right-shifted sequence; and a fourth right shift operator connected to said ninth adder and configured to shift the bit sequence corresponding to the output of said ninth adder two bit positions to the right to form a fourth right-shifted sequence.

13. The decoding system according to claim 6, wherein said value selector comprises:

a first multiplexor connected to said first decoder and configured to output a first texel value;

a second multiplexor connected to said first decoder and said second decoder and configured to output a second texel value;

a third multiplexor connected to said first decoder, said second decoder and said third decoder and configured to output a third texel value; and a fourth multiplexor connected to said first decoder, said second decoder and said fourth decoder and configured to output a fourth texel value.

14. A method of generating a decoded pixel by decoding at least one encoded texel block, said method comprising:

selectively outputting at least N texel values from at least one of N different decoders, each having a circuitry having a level of complexity that is different from the level of complexity of the circuitry of the other N−1 decoders and each is configured to decode an encoded texel block to generate at least one respective texel value, based on the positions of the at least N texels associated with said at least N texel values relative a boundary of a texel block comprising at least one of said at least N texels; and calculating a decoded pixel value of said decoded pixel based on said at least N texel values.

15. The method according to claim 14, wherein said selectively outputting comprises selectively outputting N texel values from a first decoder of said N decoders if the N texels associated with said N texel values are positioned inside said boundary of a texel block.

16. The method according to claim 14, wherein said selectively outputting comprises selectively outputting a half of N texel values from a first decoder of said N decoders and a remaining half of said N texel values from a second decoder of said N decoders if half of the N texels associated with said N texel values are positioned inside said boundary of said texel block and half of said N texels are positions inside the boundary of a neighboring texel block.

17. The method according to claim 14, wherein N is equal to four and said selectively outputting comprises selectively outputting a first texel value of said four texel values from a first decoder of said four decoders, a second texel value of said four texel values from a second decoder of said four decoders, a third texel value of said four texel values from a third decoder of said four decoders and a fourth texel value of said four texel values from a fourth decoder of said four decoders if one of said four texels is positioned inside said boundary of said texel block and each of the remaining three texels is positioned inside the boundary of a respective neighboring texel block.

* * * * *

UNITED STATES PATENT AND TRADEMARK OFFICE
CERTIFICATE OF CORRECTION

PATENT NO.         : 8,655,063 B2                                      Page 1 of 1
APPLICATION NO.    : 13/510992
DATED              : February 18, 2014
INVENTOR(S)        : Strom It is certified that error appears in the above-identified patent and that said Letters Patent is hereby corrected as shown below:

In the Specification

In Column 6, Line 48, delete "memory" and insert -- memory 5 --, therefor.

In Column 6, Line 51, delete "memory" and insert -- memory 5 --, therefor.

In Column 7, Line 64, delete "texel" and insert -- texel 34 --, therefor.

In Column 11, Line 27, delete "721-724" and insert -- 721-728 --, therefor.

Signed and Sealed this
Eighth Day of July, 2014

Michelle K. Lee
*Deputy Director of the United States Patent and Trademark Office*